United States Patent [19]
Brumfield et al.

[11] 3,983,311
[45] Sept. 28, 1976

[54] AUXILIARY GUTTER WITH LAY-IN END WALLS AND UNIVERSAL COVER

[75] Inventors: Walter T. Brumfield, Nicholasville; Robert C. Baker; Theodore L. Brann, both of Lexington, all of Ky.

[73] Assignee: Square D Company, Park Ridge, Ill.

[22] Filed: Dec. 18, 1974

[21] Appl. No.: 534,005

[52] U.S. Cl. .................................. 174/50; 317/120; 220/3.8
[51] Int. Cl.² ......................................... H02G 3/14
[58] Field of Search .................. 174/48, 49, 52, 50, 174/68 C, 70 R, 72 R, 100, 99 B, 65 R; 220/3.8; 317/120, 122

[56] References Cited
UNITED STATES PATENTS

| | | | |
|---|---|---|---|
| 2,659,765 | 11/1953 | Dunn | 174/65 R |
| 3,146,298 | 8/1964 | Ceglia | 174/100 X |
| 3,504,097 | 3/1970 | Carlson | 174/99 B X |
| 3,735,020 | 5/1973 | Licata | 174/66 |
| 3,806,628 | 4/1974 | Higgins | 174/72 R |

FOREIGN PATENTS OR APPLICATIONS

| | | | |
|---|---|---|---|
| 748,277 | 4/1956 | United Kingdom | 174/49 |

OTHER PUBLICATIONS

"Taking on a Towering Task: Putting Power Cables into the World Trade Center," Wire & Wire Products, Nov. 1971, pp. 32-34 and 36-38, 174-100.

Primary Examiner—J. V. Truhe
Assistant Examiner—D. A. Tone
Attorney, Agent, or Firm—H. J. Rathbun; E. S. Kettelson

[57] ABSTRACT

An auxiliary gutter to receive, secure and house cable for connecting to an adjacent load center. The end walls of the gutter have a recessed edge region or notch intermediately thereof with cooperating clamp means to lay-in and secure lengths of cable without cutting. Wiring cable may thus extend unbroken in one continuous run from the top floor of a building to the bottom and connect to load centers on each floor by laying in cable and clamping to respective auxiliary gutters mounted along side each load center. Tap kits connect the cable electrically to the load centers. A cover is provided which has universal features, including a break-away tab and uniquely positioned mounting holes, making the cover useable with installations where the load center is the same length as the auxiliary gutter, where the load center is shorter than the auxiliary gutter, where both are flush mounted, and where both are surface mounted.

5 Claims, 17 Drawing Figures

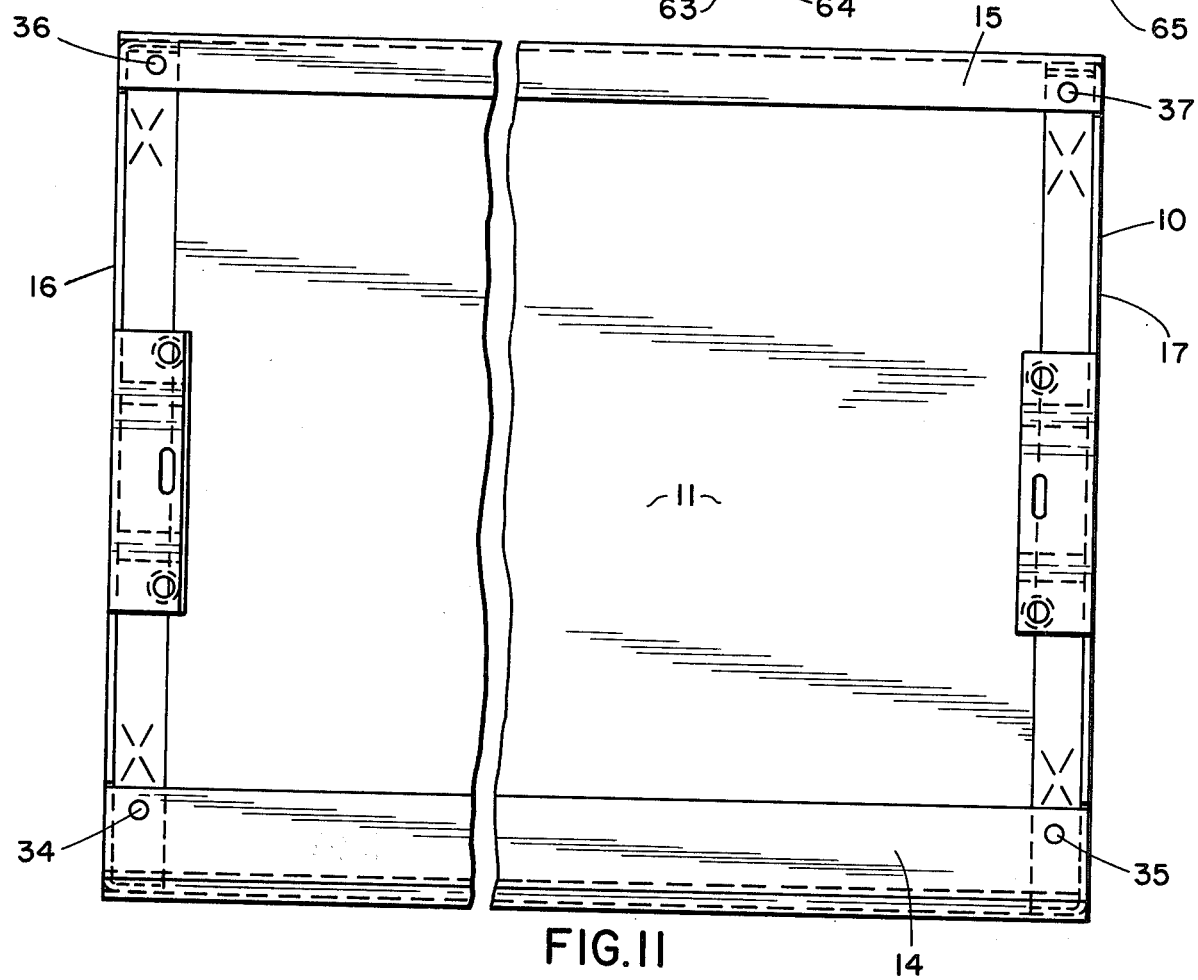

AUXILIARY GUTTER WITH LAY-IN END WALLS AND UNIVERSAL COVER

BACKGROUND OF THE INVENTION

This invention relates to the field of auxiliary gutters for receiving and housing electrical wires and cables leading to terminals of a load center or panelboard.

The trend today is toward high rise apartments, condominiums and other multi-story buildings. The service entrance in such buildings is located in the basement or bottom floor, but each apartment or condominum has its own load center. Electrical cable can be pulled floor to floor from the service entrance, cut in lengths that reach from one floor to the next, and each separate length can then be connected between a load center on one floor and one on the next floor above.

The invention herein makes it possible to avoid cutting the cable in floor to floor lengths. Instead, the wiring cable may be pulled in one continuous run from the service entrance on the bottom floor to the top floor without being cut into shorter pieces. An auxiliary gutter is provided for mounting adjacent the load center on each floor. The top and bottom end walls of each gutter have aligned recessed edge regions in which to lay the corresponding portion of cable without cutting. Clamps are provided to secure the cable to the auxiliary gutter within the recessed edge regions of the top and bottom end walls. A tap off kit connects the cable electrically to terminals of the load center in a conventional manner.

A universal cover is provided with a break-away extension tab and marginally varied mounting holes to make the auxiliary gutter and its cover useable in a plurality of different installations with load centers either of the same length or shorter than the auxially gutter.

SUMMARY OF THE INVENTION

It is an object of the invention to provide an auxiliary gutter to receive, secure and house electrical cable for connecting to an adjacent load center, the auxiliary gutter having spaced apart end walls provided with aligned recessed edge regions formed therein to receive a corresponding length of cable laid therein, and clamp means cooperating with said aligned recessed edge regions of each spaced apart end wall to secure the cable to the auxiliary gutter.

It is an object of the invention to provide an auxiliary gutter to receive, secure and house electrical cable for connecting to an adjacent load center, the auxiliary gutter being mountable along one side of the load center enclosure, the gutter and load center enclosure each having corresponding openings in their respective adjacent sides for electrical conductors to extend through from the auxiliary gutter to the load center.

It is an object of the invention to provide an auxiliary gutter for mounting along one side of a load center, the auxiliary gutter having means to receive and secure one section of a continuous run of electrical cable therein, and conductor tap means to electrically connect the cable from the auxiliary gutter to terminals of the load center.

It is on object of the invention to provide an auxiliary gutter for mounting along one side of a load center to enable connection thereto of an unbroken section of a continuous run of electrical cable, and a universal cover for the auxiliary gutter having a break-away extension tab and marginally varied mounting holes for a plurality of different installations with load centers of different sizes.

It an object of the invention to provide an auxiliary gutter for mounting along one side of a load center to enable connection thereto of an unbroken section of a continuous run of electrical cable, whereby the electrical cable in a wiring installation of a multi-story building may extend in a continuous run from the top to the bottom floor, with corresponding sections of the cable laid-in and secured to auxiliary gutters on each floor adjacent to the load center for each floor.

BRIEF DESCRIPTION OF THE DRAWINGS

FIG. 9 is an elevation view of a closing plate for use in this invention.

FIG. 10 is a plan view of the closing plate shown in FIG. 9.

FIG. 11 is a compressed plan view of an auxiliary gutter in accordance with this invention, with an intermediate portion broken away.

FIG. 12 is a compressed elevation view of the auxiliary gutter shown in FIG. 11.

DESCRIPTION OF PREFERRED EMBODIMENT

Figure 1:
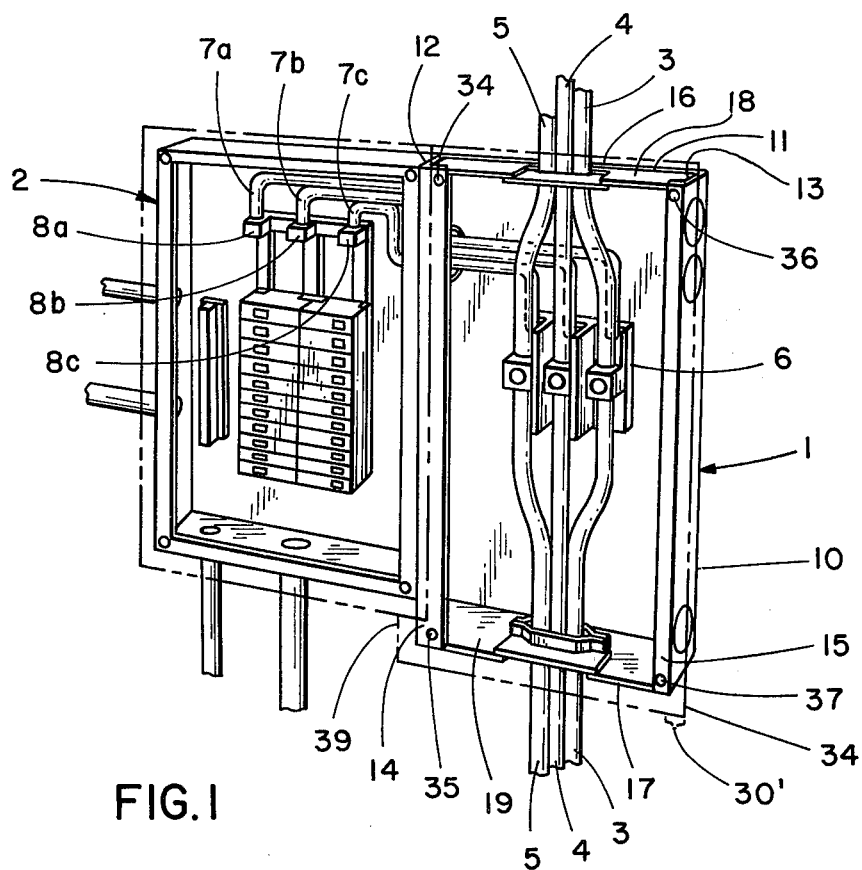
FIG. 1 is a perspective view of an auxiliary gutter in accordance with this invention in position along the side of a load center.
Figure 2:
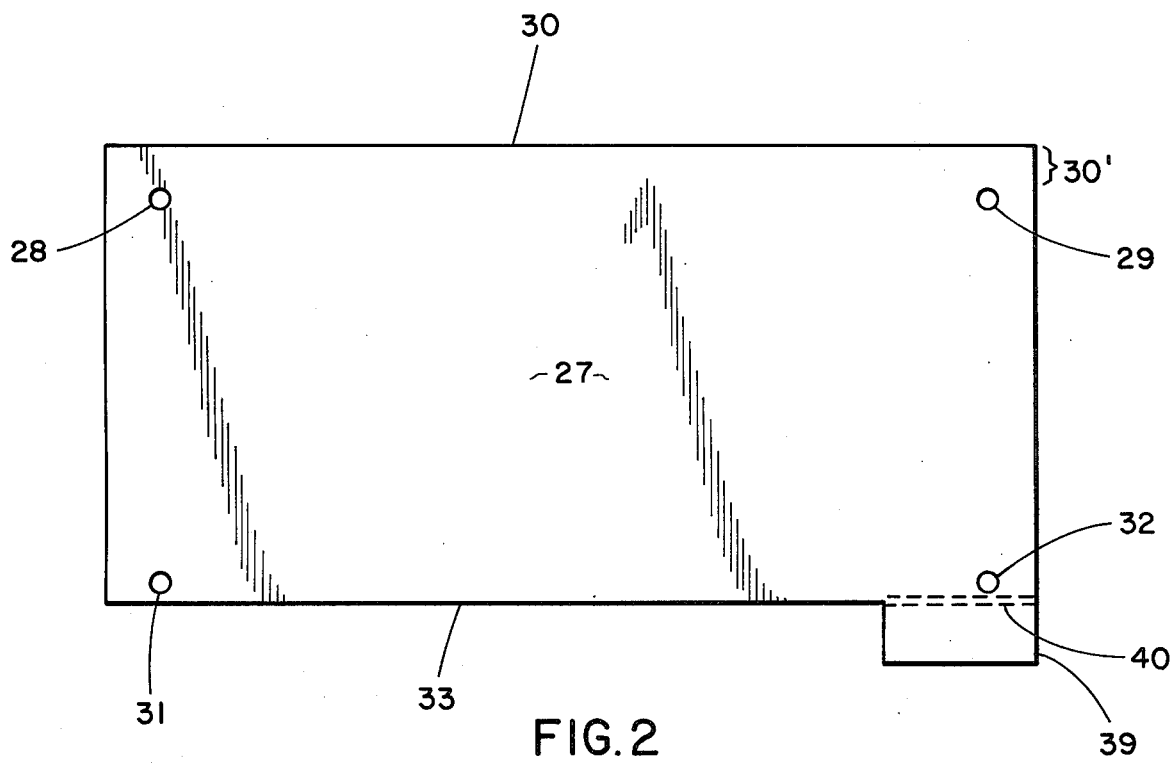
FIG. 2 is a plan view of a cover for an auxiliary gutter in accordance with this invention.
Figure 3:
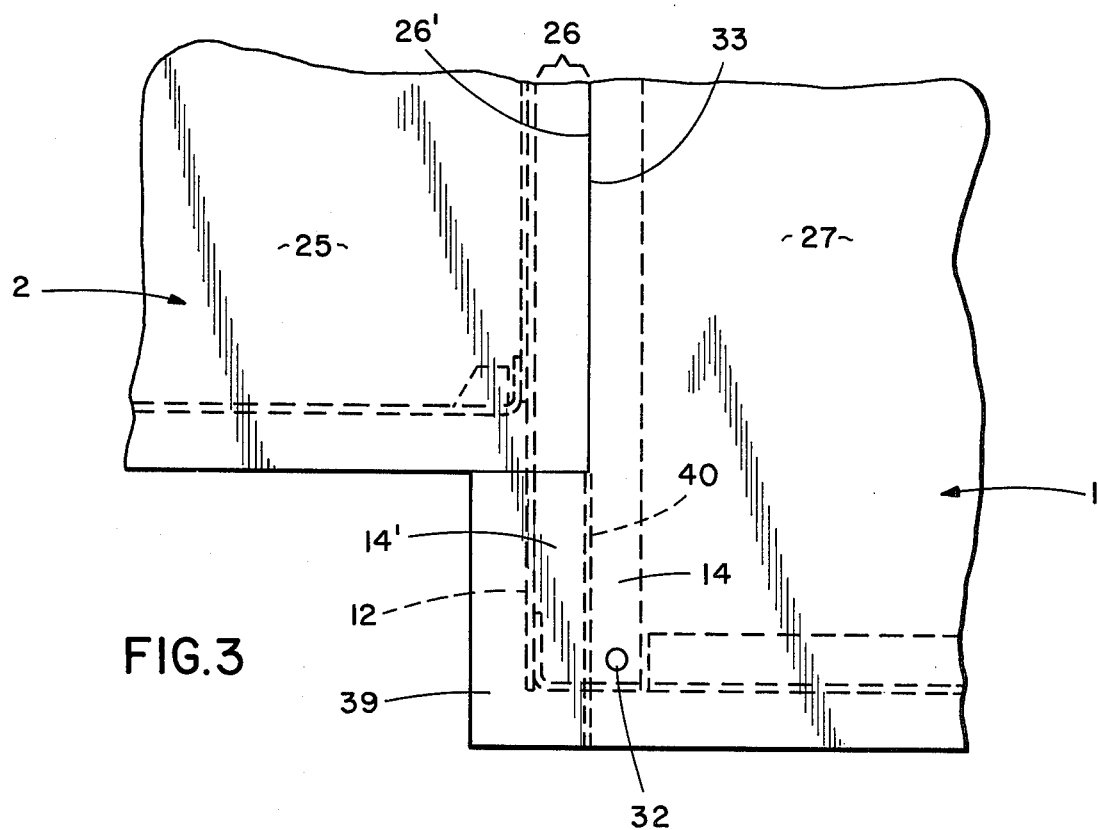
FIG. 3 is a plan view of a portion of the cover in FIG. 2 in place along the side of a cover of a load center, with portions of an auxiliary gutter and load center which is shorter than the gutter shown in broken lines.
Figure 4:
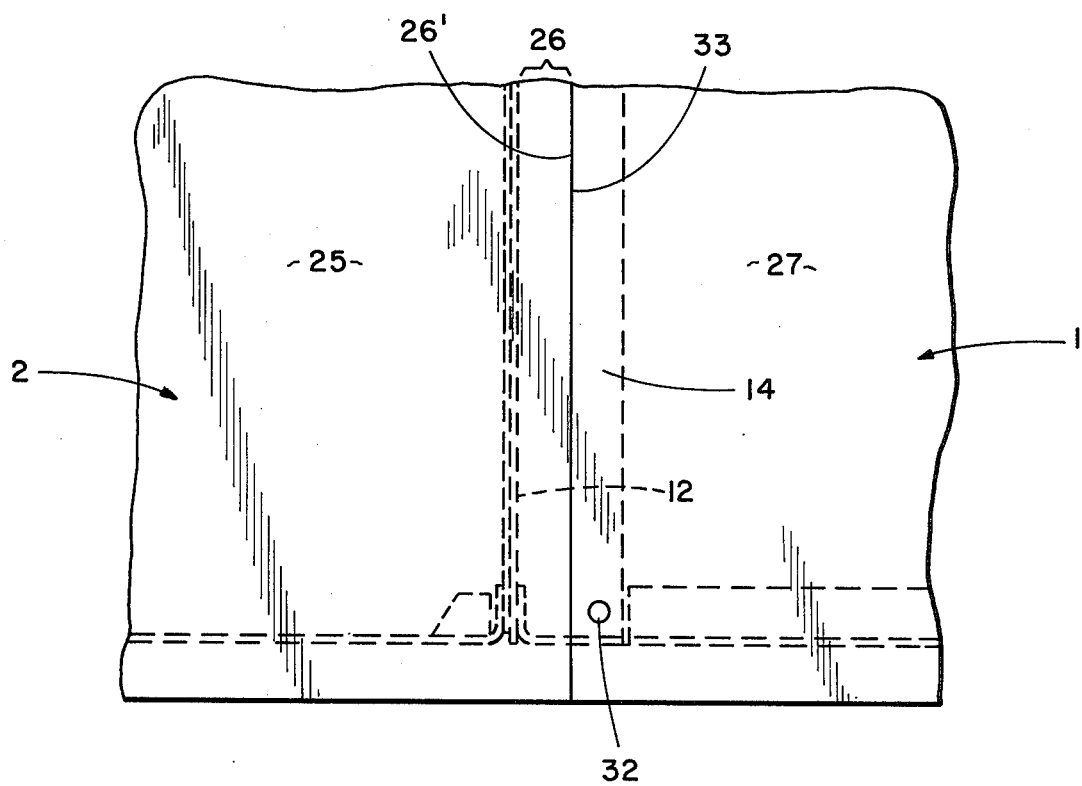
FIG. 4 is a plan view of a portion of the cover in FIG. 2 in place along the side of a cover of a load center, with portions of an auxiliary gutter and load center of the same length as the gutter shown in broken lines.
Figure 5:
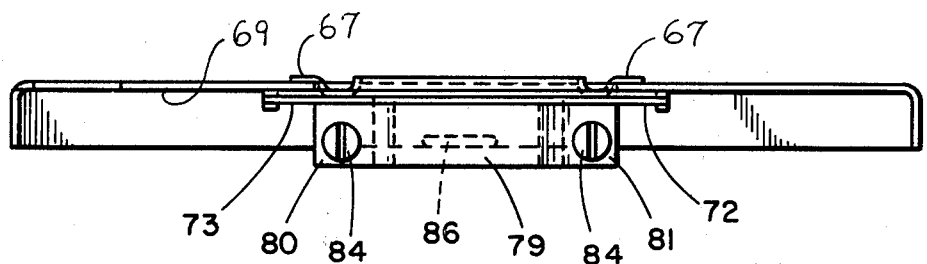
FIG. 5 is an elevation view of the end wall of an auxiliary gutter having a cable clamp member and closing plate mounted in place.
Figure 6:
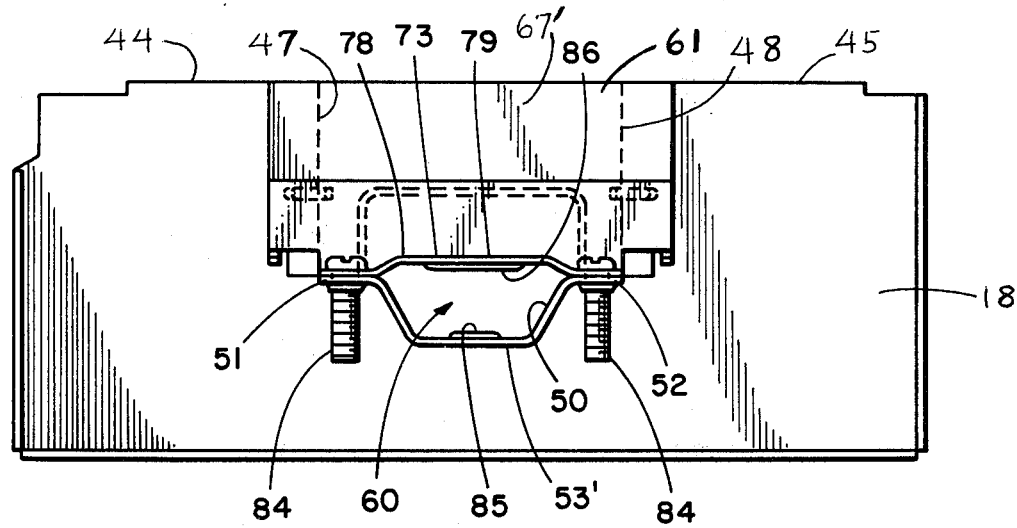
FIG. 6 is a plan view of the end wall shown in FIG. 5.
Figure 7:
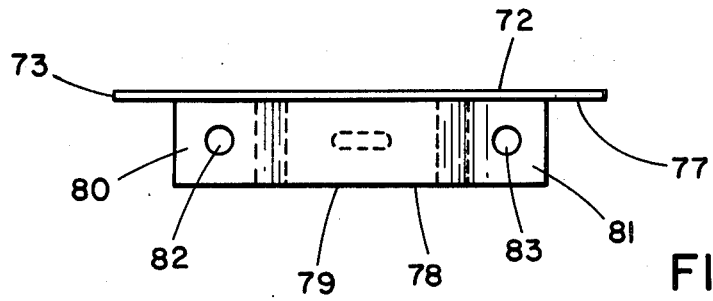
FIG. 7 is an elevation view of a cable clamp member for use in this invention.
Figure 8:
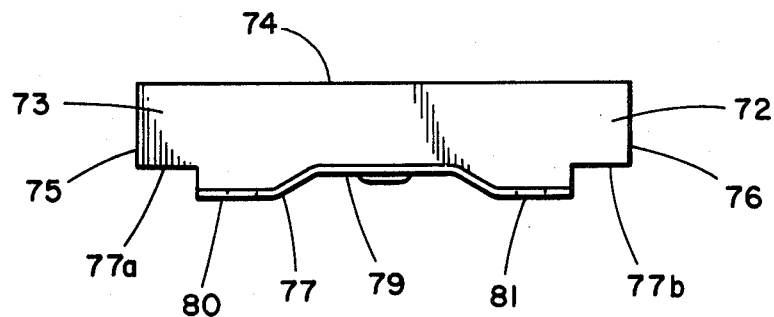
FIG. 8 is a plan view of the cable clamp member shown in FIG. 7.

An auxiliary gutter 1 is mounted along one side of load center 2. The gutter 1 receives and secures a corresponding section of the continuous runs of electrical cables 3, 4 and 5. A tap-off assembly 6 is provided for electrical connection to cables 3, 4 and 5, having tap-off conductors 7a, 7b, and 7c leading from said cables to terminals 8a, 8b and 8c of the load center 2.

The auxiliary gutter 1 includes a box assembly 10 having a rectangular plan configuration. The assembly includes a solid back wall 11 and side walls 12 and 13 extending forwardly from each opposite long side of back wall 11 and normal thereto. Inturned flanges 14 and 15 project inwardly from and normal to the forward end of side walls 12 and 13 respectively.

The two opposite short ends of box assembly 10 along opposite sides 16 and 17 are not provided with integral walls but are open to receive therein separate end walls 18 and 19 respectively.

Large knockout openings 20 are provided in side wall 12 for registration with corresponding openings in the adjacent side wall of load center 2 when mounted along side thereof. Tap-off conductors 7a, 7b and 7c extend through openings 20 for connection of terminals 8a, 8b and 8c of load center 2 to electrical cables 3, 4 and 5 secured to the auxiliary gutter.

Small knockout openings 21 are also provided in side wall 12 for registration with corresponding openings in the adjacent side wall of load center 2 when mounted along side thereof. Bolts through such openings secure the auxiliary gutter 1 to the side of load center 2.

Side wall 12 includes a stepped portion 12' offset inwardly a short distance 23. The stepped side wall 12 of auxiliary gutter 1 is mounted adjacent to one side of load center 2. Side adjacent flange 14 projects inwardly from such stepped portion 12' of side wall 12 a greater distance 24 than does side opposite flange 15 from the opposite side wall 13. The cover 24 of load center 2 has an overhang 26 along edge 26' for flush mounted installations.

A cover 27 for auxiliary gutter 1 includes two pairs of marginally varied mounting holes. A first pair of mounting holes 28 and 29 is spaced marginally inward from an overhand edge 30 of cover 27 a greater distance than a second pair of mounting holes 31 and 32 are spaced marginally inward from a flush edge 33 of cover 27. Mounting holes 28 and 29 are spaced inwardly from edge 30 a sufficient distance to provide an overhang 30' from side wall 13 of gutter 1 for flush mounted installations.

Mounting holes 31 and 32 are spaced inwardly from edge 33 a lesser marginal distance, such distance being sufficient to align edge 33 with the outer surface plane of side wall 13 for surface mounted installations, cover 27 being rotated 180° for surface mounted installations from its position for flush mounted installationa.

A flush mounted installation means that the gutter 1 and adjacent load center 2 are inset in a mounting wall with their respective open front walls co-planar with the outer surface of the mounting wall. In such an installation, the respective covers 25 (of the load center) and 27 (of the gutter) preferably extend beyond the peripheral edges of the respective load center and gutter to overhang and conceal any irregular or jagged edges and spaces between the mounting wall opening and the installed units. The overhang 30' thus covers the jagged edges and spaces between auxiliary gutter 1 and a mounting wall opening in a flush mounted installation.

A surface mounted installation means that the gutter 1 and adjacent load center 2 are not inset into a mounting wall but are mounted outwardly from the surface thereof with their respective back walls facing the outer surface of the mounting wall. In such installation it is not necessary for the covers to overhang, since there is no opening in the mounting wall and no jagged edges or spaces to conceal.

Thus in a flush mounted installation, the load center cover 25 has an overhang 26 projecting beyond the side wall against which auxiliary gutter 1 will abut. In a surface mounted installation, the load center cover 25 does not have an overhang but its side edge is coplanar with its corresponding side wall. The cover for the auxiliary gutter in accordance with this invention is useable in both types of installations by virtue of the marginally varied mounting holes.

In a flush mounted installation, the overhang 26 of load center cover 25 will partially overlay lfflange 14 when stepped side 12 abuts the corresponding side of load center 2. Gutter cover 27 will be rotated to the position where edge 33 faces edge 26' of load center cover 25. The mounting holes 31 and 32 spaced inwardly a lesser marginal distance register with respective side adjacent flange holes 34 and 35 in flange 14 when edge 33 of gutter cover 27 abuts edge 26' of overhang 26 of the load center cover 25. The mounting holes 28 and 29 spaced inwardly from edge 30 a greater marginal distance then register with respective side opposite flange holes 36 and 37 in flange 15, and overhang 34 extends outwardly beyond side wall 13 of the gutter 1. Screws are then threaded through the corresponding holes to secure cover 27 to gutter 1.

In a surface mounted installation, gutter cover 27 is rotated 180° from the flush mounted position so edge 30 not faces the corresponding edge of load center cover 25. However, cover 25 does not have an overhang in a surface mounted installation, and it does not partially overlay flange 14 when stepped side 12 abuts the corresponding adjacent side of load center 2. Edge 30 of cover 27 may now be aligned with outer edge of flange 14 to completely cover the flange. The mounting holes 28 and 29 spaced inwardly from edge 30 a greater marginal distance then register with respective side adjacent flange holes 34 and 35 in flange 14. On the opposite side, mounting holes 31 and 32 spaced inwardly from edge 33 a lesser marginal distance are at this time in registration with side opposite flange holes 36 and 37 in flange 15. There is no overhang from opposite side wall 13 in this surface mounted installation. Edge 33 extends across flange 15 and lies substantially coplanar with the outer surface of side wall 13.

The gutter cover 27 may also be provided with a break-away extension tab 39 for use in a flush mounted installation wherein the load center is shorter than the auxiliary gutter. In such case, edge 33 of cover 27 faces edge 26' of load center cover 25 which has an overhang partially overlaying flange 14 of the gutter. Throughout that portion of gutter 1 which extends beyond the shorter load center and its cover 25, a portion 14' of flange 14 is thus exposed as well as the jagged or irregular edges and spaces between the wall opening and the side wall 12 of the gutter. Break-away extension tab 39 is provided to extend laterally from edge 33 of cover 27 throughout that portion of its length from the edge of load center cover 25 to its end outwardly remote from cover 25. The lateral extension of break-away tab 39 is sufficient to extend beyond flange 14 and to overhang the space between a mounting wall opening and side wall 12 of the gutter 1 when edge 33 of cover 27 faces edge 26' of cover 25 and when mounting holes 32 and 32 spaced inwardly a lesser marginal distance are in registration with side adjacent flange holes 34 and 35 in flange 14. The longitudinal extension of break-away tab 39 is from the end of load center cover 25 to the outwardly remote end of gutter cover 27.

When the auxiliary gutter is used in surface mounted installations, the cover 27 is rotated to the position wherein edge 33 (from which break-away tab 39 extends) faces away from the adjacent load center. The opposite edge 30 aligns with the outer edge of flange 14, so the flange is completely concealed throughout its entire length by the side of the cover bordering edge 30. The extension tab 39 may thus be broken away when cover 27 is used in surface installations. A breakaway groove 40 is provided along a score line which aligns with edge 33 throughout the border between rectangular cover 27 and the extension tab 39. The tab can be bent along the score line and groove 40 by a pair of pliers or other gripping tool and thus broken away cleanly.

When the auxiliary gutter is used in flush mounted installations wherein the load centers are the same length as the auxiliary gutter, the extension tab 39 is likewise not needed since the overhang 26 of load center cover 25 overlays and conceals the edge of flange 14 of the gutter throughout its entire length. The extension tab is therefore broken away for use in any surface mounted installation, and in flush mounted installations where the load center is the same length as the auxiliary gutter. The extension tab 39 is provided for use in flush mounted installations wherein the load center is shorter than the auxiliary gutter.

End walls 18 and 19 are provided for mounting in the two opposite short ends of the box assembly 10, wall 18 herein designated as the top end wall and wall 19 as the bottom end wall. They are substantially identical except for being mirror images of each other, and for brevity only top end wall 18 will be described in detail.

Figure 13:
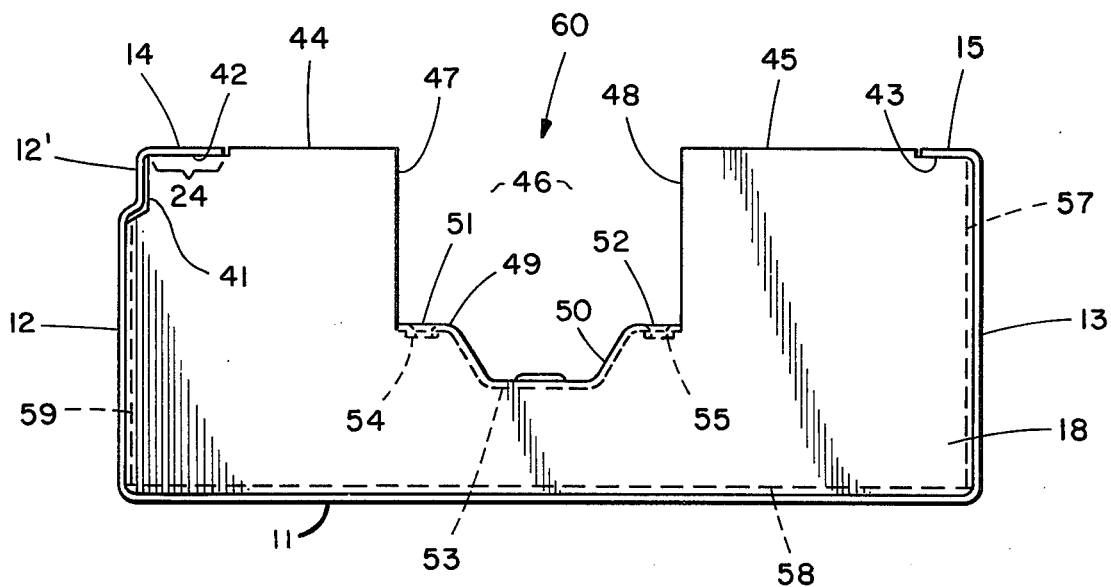
FIG. 13 is an end elevation view of the auxiliary gutter shown in FIG. 11.
Figure 14:
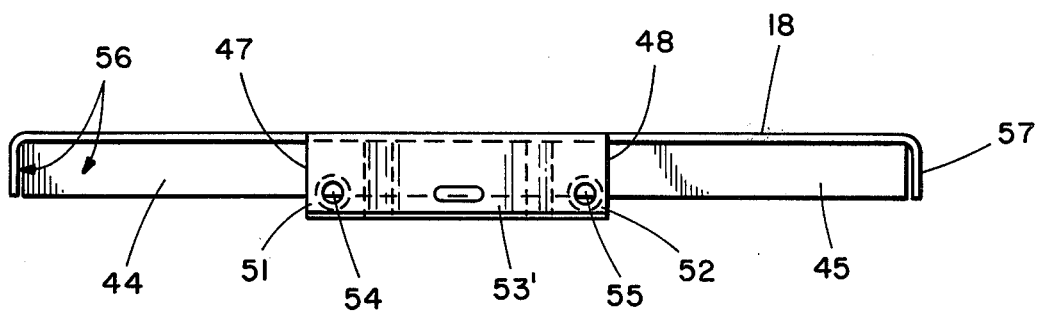
FIG. 14 is an elevation view of the end wall shown in FIG. 5 with the cable clamp member and closing plate removed.
Figure 15:
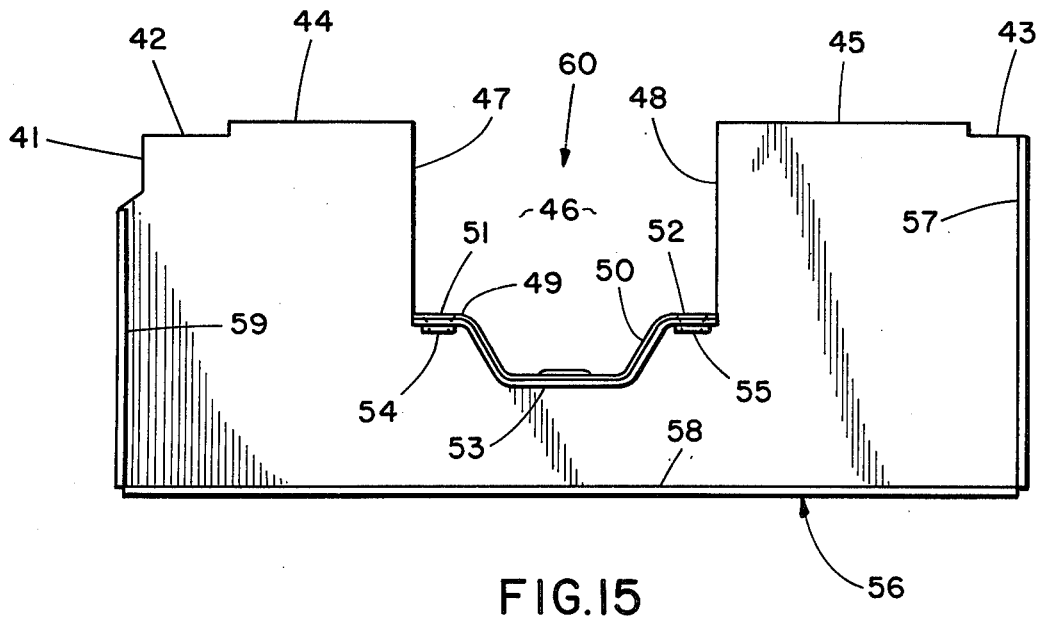
FIG. 15 is a plan view of the end wall shown in FIG. 14.
Figure 16:
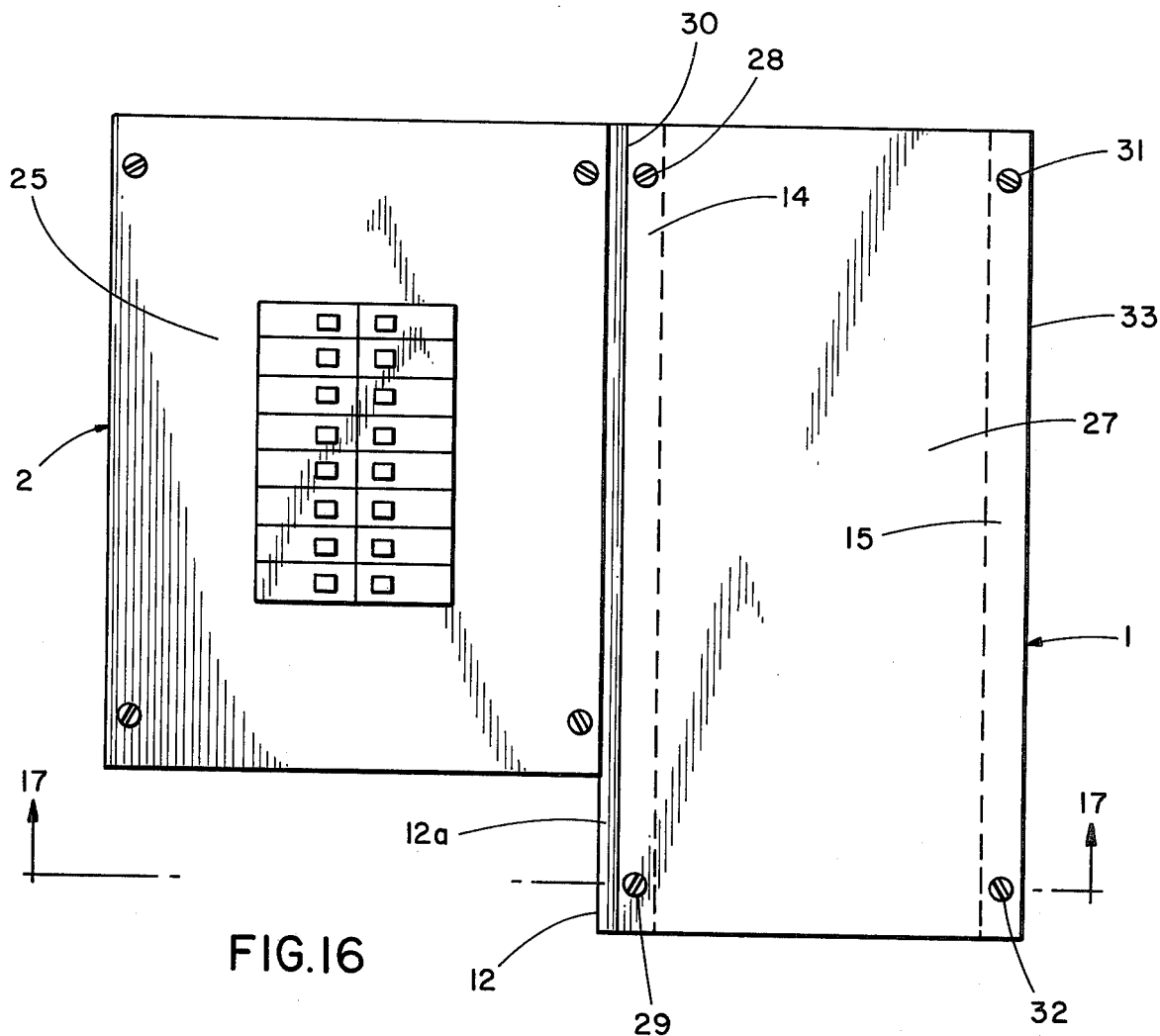
FIG. 16 is a front elevation view of an auxiliary gutter and adjacent load center, each having their respective covers in place.
Figure 17:
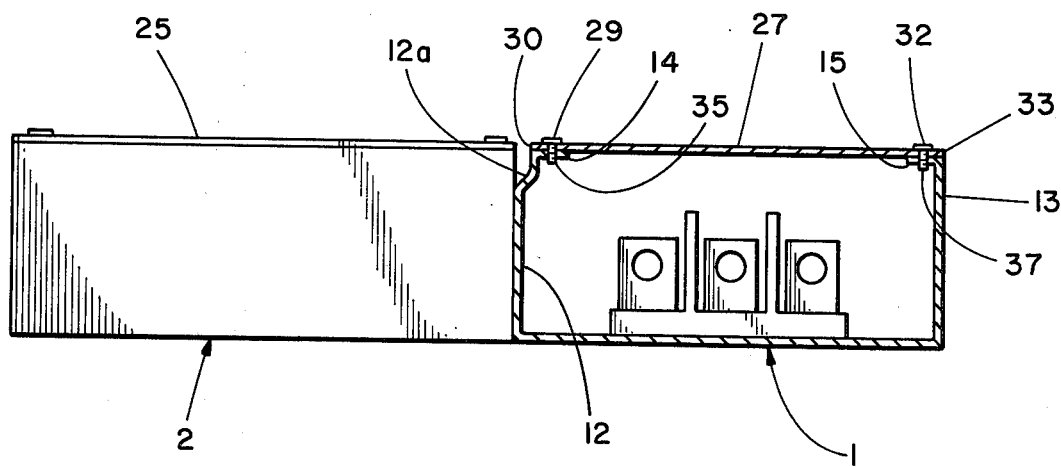
FIG. 17 is a bottom plan view of the auxiliary gutter and load center of FIG. 16, with the bottom end region of the gutter shown in section taken on line 17—17 of FIG. 16.

The peripheral plan configuration of end wall 18 is substantially rectangular and conforms to the end elevation outline of box assembly 10 presented by back wall 11, stepped side wall 12, opposite side wall 13, broad flange 14 projecting from side wall 12 and narrower flange 15 projecting from side wall 13. (See FIG. 13) Cut away corner edge portion 41 corresponds to the inwardly offset stepped portion 12' of side wall 12. Cut away forward edge portions 42 and 43 correspond to the width and thickness of flanges 14 and 15 respectively, cut away portion 42 being wider than cut away portion 43 to correspond to the width of broader flange 14. Cut away portion 43 is narrower to correspond to the width of narrower flange 15. Intermediate forward edge portions 44 and 45 are coplanar with the outer surfaces of flanges 14 and 15 of box 10. Between intermediate forward edge portions 44 and 45, a recessed edge region 46 is formed having spaced apart side edges 47 and 48 normal to edge portions 44 and 45 and extending inwardly of end wall 18 to provide a recess therein open to its forward edge. Spanning the distance between spaced apart side edges 47 and 48 at their inner ends is a contoured connecting edge 49 having a cupped configuration 50 centrally and lateral segments 51 and 52 extending from opposite ends of the central cupped configuration joining side edges 47 and 48 respectively at right angles.

A clamping flange 53 extends downwardly from top end wall 18 along the contoured connecting edge 49, formed integrally with end wall 18 along said edge 49, and being normal to the surface of end wall 18. Threaded holes 54 and 55 are formed respectively in those portions of clamping flange 53 extending from lateral segments 51 and 52, the axes of said holes lying in a plane parallel to the surface of end wall 18. A centrally cupped portion 53' of flange 53 extends between said portions extending from lateral segments 51 and 52 and borders said central cupped configuration portion of contoured connecting edge 49.

A peripheral flange 56 extends downwardly from and normal to top end wall 18 along that part of the periphery thereof beginning at the forward junction point of peripheral side edge 57 and cut-away edge portion 43, extending rearwardly along side edge 57 (corresponding to side wall 13 of box axxembly 10), across rear edge 58 (corresponding to back wall 11 of box assembly 10) and then forwardly along opposite side edge 59 (corresponding to stepped side wall 12 of box assembly 10) up to its junction with cut-away corner edge portion 41. Peripheral flange 56 fits within the end 16 of box assembly 10 defined by flange 14, stepped end wall 12, back wall 11, opposite side wall 13 and flange 15, in abutting engagement therewith.

The corresponding flange of mirror image end wall 19 similarly fits within the opposite end 17 of box assembly 10.

The end walls 18 and 19 may be secured to the box assembly 10 by any conventional means, including a permanent weld, rivets or bolts. When the end walls are secured to each respective end, a recessed through passageway 60 is provided by recessed edge regions 46 of each end wall which are axially aligned when end walls 18 and 19 are mounted in their respective ends of box assembly 10. Electrical cables 3, 4 and 5 are laid in said respective recessed edge regions to abut against clamping flanges 53.

Closing plates 61 are provided to partially close the openings in each end wall 18 and 19 defined by recessed edge regions 46. The forward edge 62 of closing plates 61 is sufficiently wide to overlap a border region along each opposite side edge 47 and 48 of recessed regions 46 in end walls 18 and 19. The opposite rearward edge 63 of closing plates 61 includes intermediate edges 64 and 65 spaced apart on opposite sides of a cut-away open region 66. The intermediate edges 64 and 65 abut against those portions of clamping flange 53 of said end walls which extend from lateral segments 51 and 52, when forward edge 62 of said closing plates is aligned flush with forward end portions 44 and 45 of said end walls extending from each side of edge 62.

Guide ears 67 are formed to project from the outward facing surface 67' of closing plates 61. Said guide ears include spaced apart flanges 68 parallel to the surface 67' and spaced therefrom a distance slightly greater than the thickness of the end walls. The guide ears 67 are spaced apart and positioned to receive, when aligned for closing, respective edge portions of said end walls along side edges 47 and 48 of recessed region 46. The outward facing surface 67' of the closing plate 61 is moved slidingly along against the inwardly facing surface 69 of the respective end wall 18 or 19 on which it is being mounted. The guide ears 67 hold the closing plate 61 in place on end walls 18 and 19 to partially close recessed region 46.

The outer opposite ends of rearward edge 63 are turned inwardly to provide abutment arms 70 and 71 which are positioned to face respective rearward edge portions of the plate of cable clamp members 72. A cable clamp member 72 is provided for each end wall 18 and 19. The cable clamp members 72 include a rectangular plate 73 having a forward edge 74 of substantially the same width as forward edge 62 of closing plates 61. Side edges 75 and 76 extend at right angles from each opposite end of forward edge 74 a distance sufficiently great that forward edge 74 lies forwardly of cut-away open region 66 of closing plates 61 when the outer ends 77a and 77b of rearward edge 77 of plate 73 engage abutment arms 70 and 71 of plates 61. The plate 73 of the cable clamps therefore closes the open region 66 of closing plates 61 when attached in clamping relationship to clamping flange 53.

A cooperative clamping flange 78 extends from the rearward edge 77 of plate 73 and normal thereto, the flange having a slightly contoured profile with a centrally indented region 79 and lateral end portions 80 and 81 extending outwardly from opposite sides of centrally indented region 79. Holes 82 and 83 are formed respectively in lateral end portions 80 and 81. When cable clamp members 72 are positioned for clamping engagement with clamping flange 53 having cables 3, 4 and 5 laid therein, holes 82 and 83 of cooperating clamping flange 73 are aligned respectively for registration with threaded holes 54 and 55 of clamping flange 53. The centrally indented region 79 of cooperative clamping flange 73 is aligned in facing relationship with the centrally cupped portion 53' of clamping flange 53. Bolts 84 are threaded through holes 82–54 and 83–55 drawing cooperative clamping flange 73 into clamping engagement with clamping flange 53, with electrical cables 3, 4 and 5 secured therebetween. Embossments 85 and 86 are formed to protrude outwardly from the facing surfaces of clamping flanges 53 and 73 respectively, to grippingly bear against opposite portions of cables 3, 4 and 5 when clamped therebetween, to thereby hold the cables more securely to the auxiliary gutter 1.

When clamping flanges 53 and 73 have been drawn up tightly by bolts 84, rectangular plate 73 completely covers the cut-away central open region 66 of closing plates 61, said closing plates covering the balance of the open space provided between side edges 47 and 48 of recessed edge region of the end walls 18 and 19.

Closing plates 61 and cable clamp members 72 as described are provided for each end wall 18 and 19. Cables 3, 4 and 5 are therefore securely clamped at each end of the auxiliary gutter 1 from which they extend in an unbroken run.

A tap off assembly 6 connects cables 3, 4 and 5 electrically to terminals 8a, 8b and 8c of load center 2 by means of tap-off conductors 7a, 7b and 7c which lead through large knockout openings 20 from the auxiliary gutter 1 to load center 2.

Cover 27 is then attached to the auxiliary gutter as described above depending on whether the installation is flush mounted or surface mounted.

We claim:

1. An auxiliary gutter assembly securing and housing a section of a continuous length of electrical cable, said gutter being connected along one side to a load center, said gutter including a housing having an open front wall and oppositely spaced apart peripheral wall portions, lay-in channel means formed in said oppositely spaced apart peripheral wall portions including channel entrance means therein open to said front wall, a section of a continuous length of cable received within said housing, and universal cover means detachably secured to said housing to close said front wall, said universal cover means comprising a flat cover plate, a first straight longitudinal edge along one side thereof, a second straight longitudinal edge spaced apart from said first edge along the opposite side of said cover plate, said first and second longitudinal edges being parallel, a first side margin of said cover plate bordering said first longitudinal edge, a second side margin of said cover plate bordering said second longitudinal edge, said housing of said gutter including spaced apart parallel first and second longitudinal side walls, a first side wall flange extending laterally from the forward edge of said first longitudinal side wall, a second side wall flange extending laterally from the forward edge of said second longitudinal side wall, mounting aperture means positioned in said first and second side margins of said cover plate, said aperture means in said first side margin being located closer to its corresponding longitudinal side edge than said aperture means in said second side margin is to its corresponding longitudinal side edge, and correponding mounting bolt means positioned through said side wall flanges in attaching association with said mounting aperture means in said cover plate, said mounting bolt means through said first side wall flange being spaced farther from said first longitudinal side wall than said mounting bolt means through said second side wall flange are spaced from said second longitudinal side wall, the dimension across said front wall cover plate between said first and second longitudinal edges is sufficient in relation to the corresponding dimension across said housing for said second longitudinal edge of said cover plate to overhang said second longitudinal wall of said housing when said cover plate is mounted in position for a flush mounted installation, whereby said aperture means in said first side margin of said cover plate are in registration with said mounting bolt means through said first side wall flange of said housing and the aperture means in said second side margin of said cover plate are in registration with said mounting bolt means through said second side wall flange, said first longitudinal edge of said cover plate lying inwardly from said first longitudinal side wall of said housing and said second longitudinal edge of said cover plate overhangs said second longitudinal wall of said housing when said aperture means in said cover plate and respective mounting bolt means through said flanges of said housing are in registration for a flush mounted installation, said cover plate including a break-away extension tab integrally formed to extend longitudinally a pre-determined length along said first longitudinal edge of said cover plate beginning from one end thereof, said extension tab extending laterally a pre-determined width from said first longitudinal edge of said cover plate, and a weakened region along a junction line between said extension tab and said cover plate to enable breaking said extension tab away from said cover plate along said junction line, said junction line being a continuation of said first longitudinal edge.

2. An auxiliary gutter as set forth in claim 1, wherein said predetermined length of said extension tab is the difference between the length of said front wall cover plate and the length of the cover plate of a shorter adjacent load center to which said auxiliary gutter is attached.

3. An auxiliary gutter as set forth in claim 1, wherein said pre-determined length of said extension tab is equal to the distance between one end of said front wall cover plate and the corresponding end of the cover plate of a shorter adjacent load center to which said auxiliary gutter is attached.

4. An auxiliary gutter as set forth in claim 1, wherein said pre-determined width is equal to the width of said exposed portion of said first side wall flange when said cover plate is mounted in position for a flush mounted installation plus an additional amount sufficient to overhang said first longitudinal side wall of said housing throughout the longitudinal extent of said break-away extension tab.

5. An auxiliary gutter assembly as set forth in claim 1, wherein said cover is axially rotatable 180° for a surface mounted installation of said assembly, said aperture means in said first side margin of said cover plate being registrable with said mounting bolt means through said second side wall flange of said housing and the aperture means in said second side margin of said cover plate being registrable with said aperture means in said first side wall flange, the said first longitudinal edge of said cover plate bordering said first side margin being then flush with said second longitudinal side wall of said housing and said second longitudinal edge of said cover plate bordering said second side margin is then flush with said first longitudinal side wall of said housing to overlay said first side wall flange.

* * * * *